(12) United States Patent
Correale, Jr. et al.

(10) Patent No.: US 7,779,237 B2
(45) Date of Patent: *Aug. 17, 2010

(54) ADAPTIVE EXECUTION FREQUENCY CONTROL METHOD FOR ENHANCED INSTRUCTION THROUGHPUT

(75) Inventors: Anthony Correale, Jr., Raleigh, NC (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/776,222

(22) Filed: Jul. 11, 2007

(65) Prior Publication Data

US 2009/0019265 A1 Jan. 15, 2009

(51) Int. Cl.
G06F 9/30 (2006.01)
G06F 9/302 (2006.01)

(52) U.S. Cl. ..................... 712/221; 712/222
(58) Field of Classification Search ............... 712/221, 712/222
See application file for complete search history.

(56) References Cited

U.S. PATENT DOCUMENTS

| | | | | |
|---|---|---|---|---|
| 3,656,123 A | * | 4/1972 | Carnevale et al. | 713/600 |
| 5,309,561 A | | 5/1994 | Overhouse et al. | |
| 5,420,808 A | * | 5/1995 | Alexander et al. | 713/321 |
| 5,844,830 A | * | 12/1998 | Gorshtein et al. | 708/495 |
| 5,987,617 A | | 11/1999 | Hu et al. | |
| 6,101,596 A | * | 8/2000 | Tanaka et al. | 712/216 |
| 6,163,837 A | * | 12/2000 | Chan et al. | 712/216 |
| 6,279,100 B1 | * | 8/2001 | Tremblay et al. | 712/24 |
| 6,487,675 B2 | * | 11/2002 | Sager et al. | 713/501 |
| 6,715,090 B1 | * | 3/2004 | Totsuka et al. | 713/323 |
| 6,996,701 B2 | * | 2/2006 | Shimamura | 712/221 |
| 7,243,217 B1 | * | 7/2007 | Oliver et al. | 712/222 |
| 7,287,173 B2 | * | 10/2007 | Hsieh | 713/320 |
| 7,523,339 B2 | * | 4/2009 | Shinkawa | 713/600 |
| 2002/0038418 A1 | * | 3/2002 | Shimamura | 712/245 |
| 2002/0184543 A1 | | 12/2002 | Wingen | |
| 2004/0243866 A1 | | 12/2004 | Sherburne, Jr. | |
| 2005/0138450 A1 | * | 6/2005 | Hsieh | 713/320 |
| 2005/0166073 A1 | * | 7/2005 | Lee | 713/300 |
| 2005/0262374 A1 | * | 11/2005 | Shinkawa | 713/500 |
| 2006/0080566 A1 | | 4/2006 | Sherburne, Jr. | |
| 2007/0143757 A1 | * | 6/2007 | Chiba | 718/100 |

\* cited by examiner

*Primary Examiner*—Aimee J Li
(74) *Attorney, Agent, or Firm*—Dillon & Yudell LLP

(57) ABSTRACT

A method, system and processor for adaptively and selectively controlling the instruction execution frequency of a data processor. Processing logic or a software compiler determines when a number of first-type instructions, requiring longer execution latency, are scheduled to be executed. The logic/compiler then triggers the CPM unit to automatically switch the execution frequency of the instruction processor from a first frequency that is optimal for processing regular-type instructions to a second, pre-established lower frequency that is optimal for processing the first-type instructions, to enable more efficient execution and higher execution throughput of the number of first-type operations within the processor. When the first-type instructions have completed execution, the processor's instruction execution frequency is returned to the first optimal frequency.

20 Claims, 12 Drawing Sheets

ADAPTIVE EXECUTION FREQUENCY CONTROL METHOD FOR ENHANCED INSTRUCTION THROUGHPUT

RELATED APPLICATIONS

The present application is related to the subject matter of commonly assigned, co-pending U.S. patent application Ser. No. 11/776,121, titled "Adaptive Execution Cycle Control Method For Enhanced Instruction Throughput," filed concurrently herewith. Relevant content of the related application is incorporated herein by reference.

BACKGROUND OF THE INVENTION

1. Technical Field

The present invention generally relates to data processors and in particular to improving instruction throughput for processor execution frequency.

2. Description of the Related Art

Instruction execution throughput is an important measure of processor efficiency. This throughput directly correlates to the frequency at which the central processing unit (CPU) is able to process the instructions being executed thereon. Conventional CPU cores are typically designed to run at a high frequency, but are limited in actual execution frequency by critical subunits, which dictate the execution frequency. That is, the CPU cores execute instructions at the highest frequency supported by the critical subunits, which frequency is typically lower than the highest design frequency of the processor. These subunits comprise execution stages of the processor pipeline that execute particular types of operations, such as multiply operations, which are frequency-limiting operations. The subunits limit the maximum frequency operation of the CPU because execution of the particular-type operations cannot be completed at the higher processor frequency. In some processor designs, attempts at such higher frequency execution with the particular-type operations result in errors and/or stalls in the execution path, effectively reducing the processor throughput.

The frequency limiting operations (such as a sequence of multiple instructions) occur only very infrequently in the instruction execution stream, but force the processor's frequency and throughput to the lower limits, particularly when these instructions do occur within the instruction stream. For example, a multiply instruction may take three cycles to complete and has a limiting effect on the frequency to provide only 80% of throughput. To accommodate these multiply instructions, the entire processing sequence for all instructions is run at 80%, limiting the processor operations to 80% throughput at all times. As an example, a multiply operation in the execution pipe is limited (based on current design) to 800 MHz. With the frequency of the processor being 1000 MHz, the multiply operation becomes a limiting factor to high frequency execution.

Certain enhancements have been implemented, or proposed, to address the frequency limitations introduced by these subunits. For example, in one design, additional stages are introduced within the execution pipe. Adding more stages to the multiply sub unit is one way to increase the frequency but the addition of stages degrades the latency and increases the area. In another design, a certain amount of parallelism is provided, and additional transistors are introduced to cause the frequency limiting elements to be processed faster. However, both of these proposals involve substantially more hardware on the processor die, which results in larger area requirement, greater power consumption, and an associated increase in costs.

Such proposals lead to contrary design options from the designs desired for high density System on Chip (SoC). In SoC designs today, there is a growing focus on reducing area on chip and creating power efficient designs. The latest methods of Voltage Islands, Adaptive Voltage Controls, Software Voltage Controls, Adaptive Frequency Controls, etc. are all focused on power efficiency and/or efforts to lower Application Specific Integrated Circuit (ASIC)/SoC power while maintaining the highest levels of performance.

The PPC4xx CPU core is one of the leading CPU cores in the industry for performance/power capabilities in the 32-bit general purpose microprocessor arena. With the technology advent into 90 nm, 65 nm, and 45 nm, ASIC power density becomes one of the most critical design hurdles. Since CPU cores are the main functional part of the ASIC and are designed to run faster than any other functional components of the ASIC, the CPU/microprocessor core is the main focus in improving power efficiency and performance of ASICs. Within the CPU core there are numerous functional building blocks, each with their own power/performance attributes. It is thus not uncommon that a small set of units or sub-units within the core have operating constraints which limit the performance attributes of these units. These units tend to be those units within the execution stages that process the frequency limiting operations. Thus, as described above, these units may either dictate the overall performance (i.e., throughput) of the entire CPU or may be designed with additional components to achieve the desired performance goal at the sacrifice of power efficiency.

SUMMARY OF ILLUSTRATIVE EMBODIMENTS

Disclosed is a method, system and computer program product for improving the throughput of a processor when executing frequency limiting operations (such as a sequence of multiple instructions) by adaptively and selectively controlling the execution frequency of functional units in the processor. In a first embodiment, a processor-level (frequency) control system selectively changes the processor's (clock) frequency for various arithmetic and logical operations, which are traditionally frequency limiting operations (i.e., cause a measurable slow down of the processor frequency). The processor-level frequency control system provides a utility or logic that monitors complied execution code and recognizes when a sequence of particular-type instructions/operations, such as a pre-set number of multiply operations, for example, are queued up for execution by the processor. The frequency control system dynamically adjusts the frequency of the processor from a higher (normal) frequency to a pre-established lower optimal frequency to allow the highest multiply operation throughput. The frequency control system then readjusts the processor frequency back to the higher frequency upon completion of the sequence of (multiply) operations. In one embodiment, the frequency control system adjusts the processor frequency by triggering the clock and power management unit associated with the processor, which sets the processor's operating frequency.

In another embodiment, a pipeline stage-level mode control system is implemented. The pipeline stage-level mode control system introduces a hardware controllable cycle in place of the processor's clock frequency when executing a sequence of particular-type operations at particular stages of the execution pipeline. The mode control system includes one or more instruction cycle management (ICM) logics/circuits, which may be integrated within the processor and associated with specific execution pipeline stages of the processor. The mode control system counts the number of consecutive operations of the particular type (e.g., multiply operations) scheduled for execution by the processor. When the number of particular-type operations is above a certain threshold count, the mode control system then directs the ICM logic to insert additional cycles per instruction (independent of the processor frequency) to the operations occurring at the particular execution pipeline stages. The ICM logic changes from a single "cycle per instruction" operation mode to a pre-defined "multiple cycle per instruction" mode, which increases the number of cycles taken to complete each of the particular-type operations. Thus, the "cycle per instruction" (i.e., the number of cycles per operation) frequency is increased at the particular execution stages to improve throughput of these particular-type operations. If the number of particular-type operations is below the threshold, then the mode control system maintains the cycle frequency at (or returns the cycle frequency to) the normal one cycle per instruction for regular-type operations.

The frequency/mode control systems dynamically support the instruction latency and the throughput-per-instruction for regular operations at the base frequency, while executing the particular-type instructions at a higher cycle per instruction or lower optimal frequency in order to improve CPU throughput and reduce CPU dynamic power usage without greatly impacting the CPU performance.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
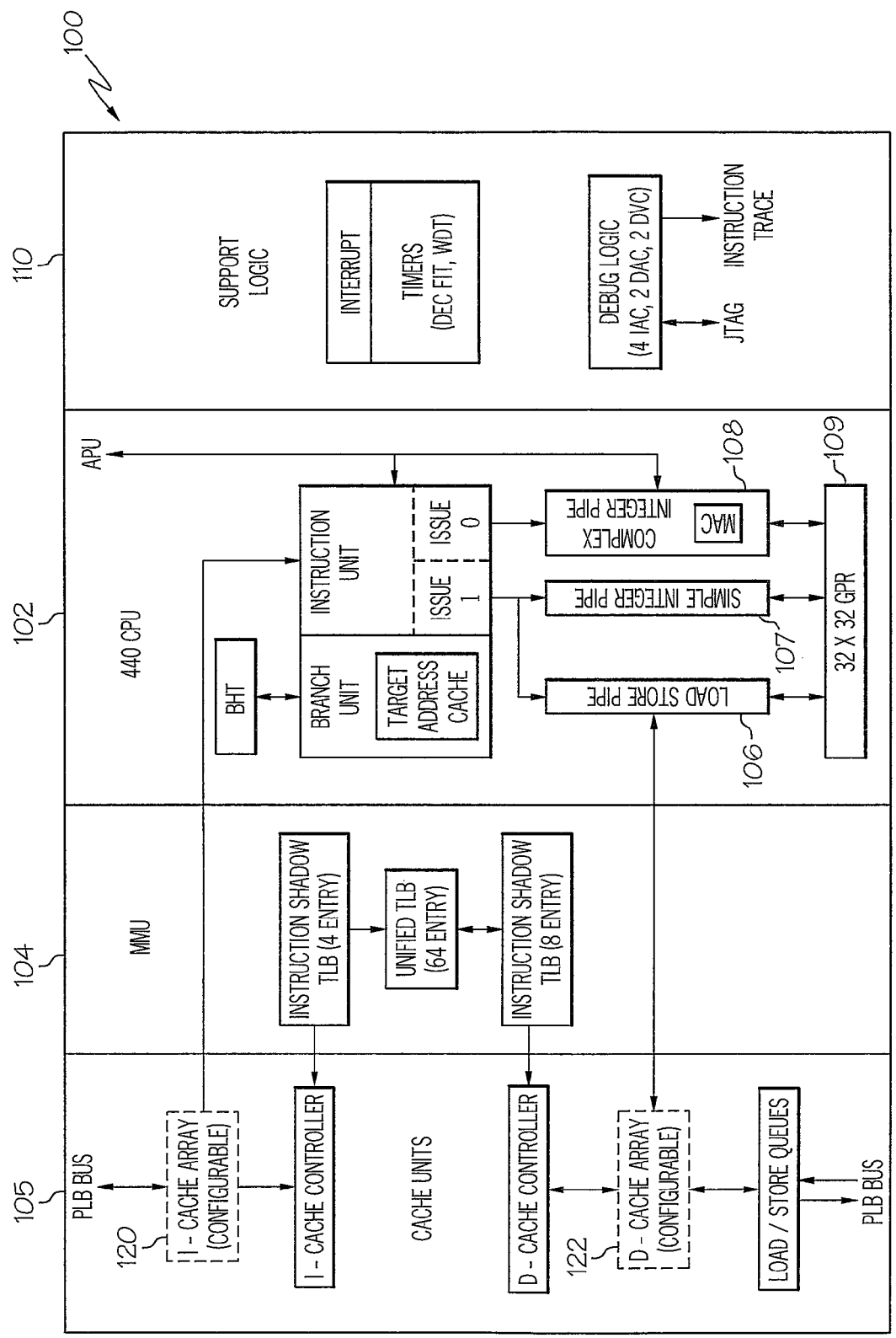
FIG. 1 depicts a Power PC440 embedded core, within which features of the invention may be advantageously implemented.

The present invention provides a method, system and computer program product for adaptively controlling the execution frequency, cycle-per-operation, and power usage of functional units in data processors. Two primary implementation of the invention are described herein, namely, a processor-level implementation and pipeline stage-level implementation.

With the processor-level implementation, a (frequency) control system implements a software controllable cycle that selectively changes the processor's (clock) frequency for various arithmetic and logical operations. The processor-level frequency control system may be software-based/controlled or logic-based. Both methods monitor complied execution code and recognizes when a sequence of particular-type instructions/operations, such as a pre-set number of multiply operations, for example, are queued up for execution by the processor. The frequency control system dynamically adjusts the frequency of the processor from a higher (normal) frequency to a pre-established lower frequency to allow the highest multiply operation throughput. The frequency control system then readjusts the processor frequency back to the higher frequency upon completion of the sequence of (multiply) operations. The frequency control system farther supports the normal instruction latency and throughput per instruction in order to reduce the processor's dynamic power without greatly impacting the processor's performance.

The pipeline stage-level implementation provides a mode control system, which is implemented via hardware at specific stages within the processor's execution pipepline, without affecting the overall processor frequency. The pipeline stage-level mode control system introduces a hardware controllable cycle in place of the processor's clock frequency when executing a sequence of particular-type operations at particular stages of the execution pipeline. The mode control system includes one or more instruction cycle management (ICM) logics/circuits, which may be integrated within the processor and associated with specific execution pipeline stages of the processor. The mode control system counts the number of consecutive operations of the particular type (e.g., multiply operations) scheduled for execution by the processor. When the number of particular-type operations is above a certain threshold count, the mode control system then directs the ICM logic to insert additional cycles per instruction (independent of the processor frequency) to the operations occurring at the particular execution pipeline stages. The ICM logic changes from a single "cycle per instruction" operation mode to a pre-defined "multiple cycle per instruction" mode, which increases the number of cycles taken to complete each of the particular-type operations. When the number of particular-type operations is below the threshold number, then the mode control system ensures that the cycle frequency is at or returned to the normal cycle frequency for regular-type operations.

Figure 3:
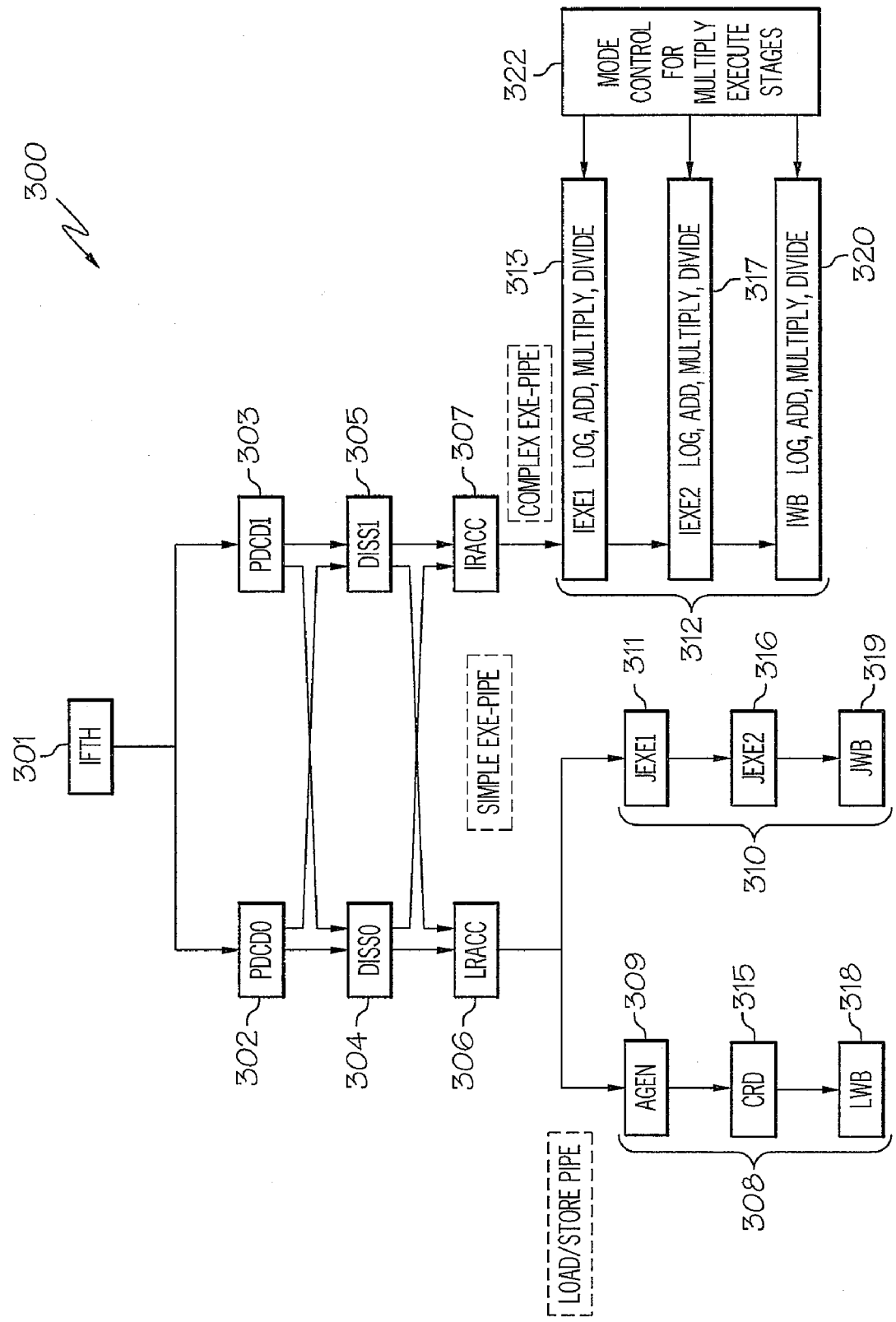
FIG. 3 is a block diagram illustrating a PPC440 pipeline structure with hardware controllable cycles-per-operation, according to an illustrative embodiment of the present invention.
Figure 4A:
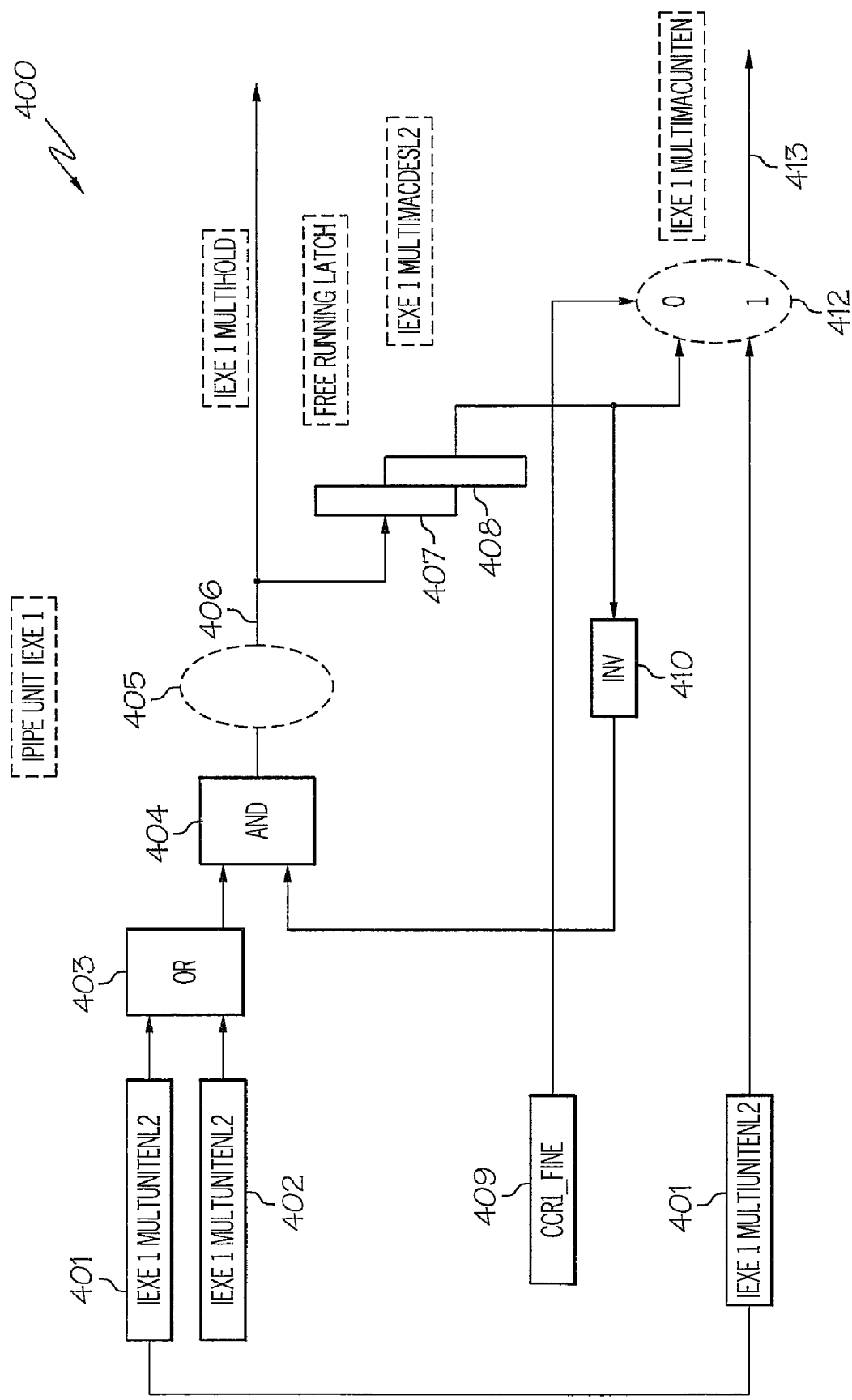
FIG. 4A is a block diagram representation of an Execute stage 1 mode control (or execution time control) system for controlling execution cycles per multiply operations (and multiply and accumulate (MAC) operations), according to an illustrative embodiment of the present invention.
Figure 4B:
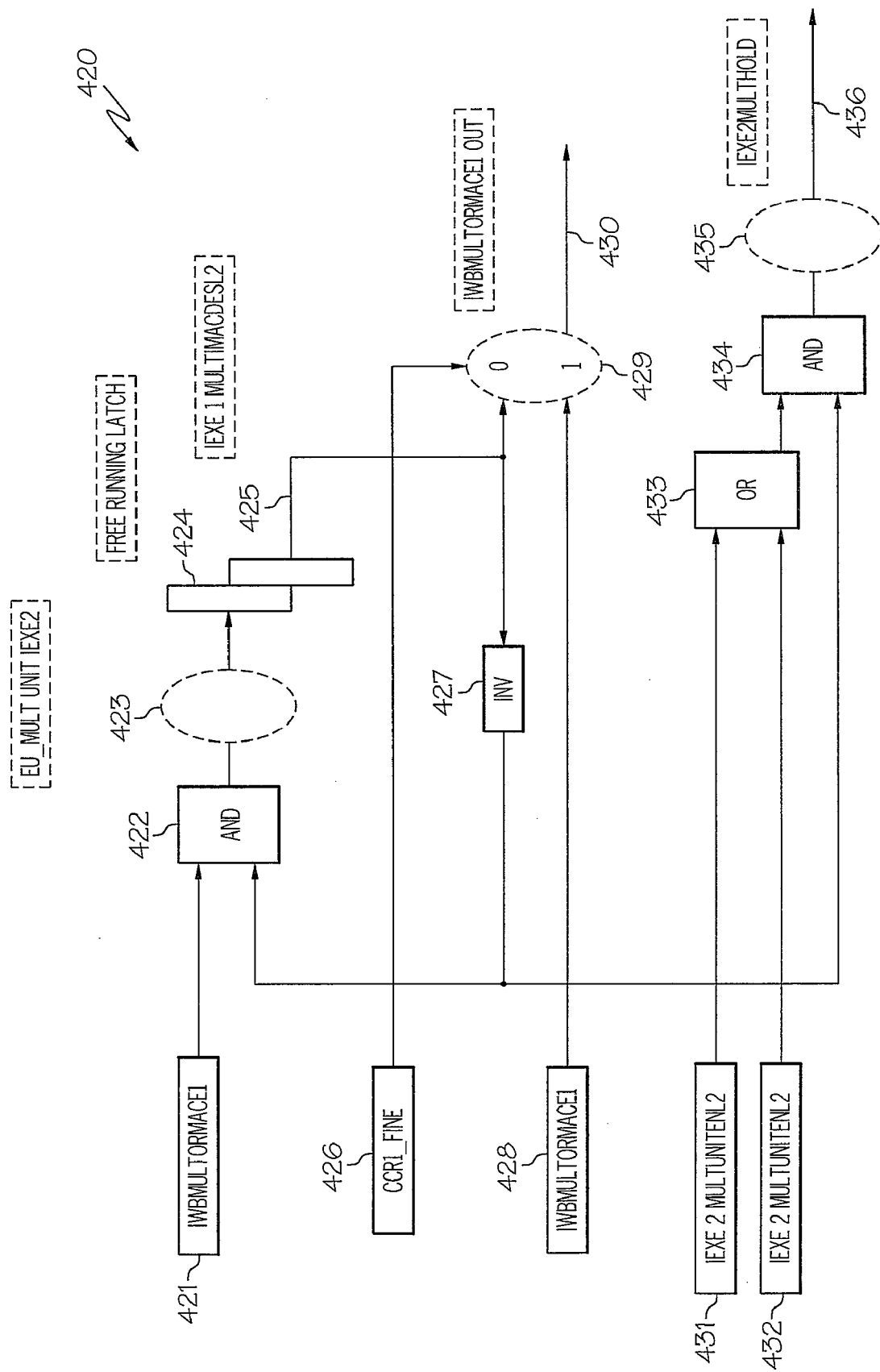
FIG. 4B is a block diagram representation of an Execute stage 2 mode control (or execution time control) system for controlling execution cycles per multiply operations (and MAC operations), according to an illustrative embodiment of the present invention.

Sub-headings are provided within the specification to enable clear demarcation of the descriptions of the software and hardware implementations. Also, the embodiments of the software-based frequency control system are illustrated in FIGS. 2, 7, 8 and 9, while the embodiments of the hardware-based mode control system are illustrated in FIGS. 3, 4A and 4B.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation. A list of the acronyms and other terms utilized herein, along with their meanings/definitions are as follows:

| | |
|---|---|
| CPU: | Central Processing Unit |
| SoC: | System on Chip |
| ASIC: | Application Specific Integrated Circuit |
| PowerPC440: | one of IBM PowerPC Architecture based 32-bit embedded processors |
| MAC: | Multiply-Accumulate class instruction |
| L-pipe: | load or store class instruction execution pipe in the PowerPC440 processor |
| I-pipe: | simple and/or complex integer class instruction, including multiply and/or divide instruction, execution pipe in the PowerPC440 processor |
| J-pipe: | simple integer class instruction execution pipe in the PowerPC440 processor |
| IFTH stage: | Instruction fetch stage |
| PDCD stage: | Pre-decode stage, there are PDCD0 and PDCD1 |
| DISS stage: | Decode and Issue stage, there are DISS0, DISS1, DISS2, DISS3 |

-continued

| | |
|---|---|
| LRACC stage: | L-pipe Register Access stage |
| IRACC stage: | I-pipe Register Access stage |
| AGEN stage: | L-pipe Address Generation stage |
| CRD stage: | L-pipe data Cache Read stage |
| LWB stage: | L-pipe Write-back stage |
| IEXE1 stage: | I-pipe Execution stage-1 |
| IEXE2 stage: | I-pipe Execution stage-2 |
| IWB stage: | I-pipe Write-back stage |
| JEXE1 stage: | J-pipe Execution stage-1 |
| JEXE2 stage: | J-pipe Execution stage-2 |
| JWB stage: | J-pipe Write-back stage |
| MMU: | Memory Management Unit |
| TLB: | Table Look-aside Buffer for page virtual address to real address translation |
| DPS: | Data Processing System |
| USB: | Universal Serial Bus |
| I-cache: | Instruction cache |
| D-cache: | Data cache |
| APU: | Auxiliary Processor Unit |
| AIX OS: | Advanced Interactive Executive Operating System |
| Log: | Logic operation |
| INV: | Inverter |
| CCR1: | hardware Configuration Control Register-1 |
| Iexe1MultUnitEnL2: | latched IEXE1 Multiply execution Unit Enable control |
| Iexe1MacUnitEnL2: | latched IEXE1 MAC execution Unit Enable control |
| Iexe1MultMacUnitEn: | IEXE1 Multiply and MAC execution Unit Enable control |
| Iexe1MultMacDesL2: | latched IEXE1 Multiply and MAC execution designator |
| Iexe2MultUnitEnL2: | latched IEXE2 Multiply execution Unit Enable control |
| Iexe2MacUnitEnL2: | latched IEXE2 MAC execution Unit Enable control |
| Iexe2MultMacUnitEn: | IEXE2 Multiply and MAC execution Unit Enable control |
| Iexe2MultMacDesL2: | latched IEXE2 Multiply and MAC execution designator |
| IwbMultOrMacE1: | IWB stage Multiply or MAC operand latch-1 enable |
| EU_mult unit Iexe2: | IEXE2 stage of Multiply unit in the Execution unit |
| Iexe2MultHold: | IEXE2 stage of Multiply operation hold control |
| SPR: | Special Purpose Register |
| GPR: | General Purpose Register |

With reference now to the figures, FIG. 1 depicts a PowerPC440 embedded core, within which features of the invention may be advantageously implemented. Core 100 comprises Central Processing Unit (CPU) 102, Memory Management Unit (MMU) 104 and cache unit 105. Associated with Core 100 is Support Logic 110. CPU 102 further comprises three distinct execution pipes, namely: (1) The load/store pipe (L-pipe) 106; (2) the simple integer pipe 107 (J-pipe); and (3) the complex integer pipe 108 (I-pipe). The three execution pipes are further illustrated and explained with the aid of FIG. 3, described below. In one embodiment, CPU 102 operates on instructions in a dual issue, seven stage pipeline, capable of dispatching two instructions per clock to multiple execution units and to optional Auxiliary Processor Units (APUs).

CPU 102 also includes General Purpose Register (GPR) 109. Conceptually, GPR 109, consists of thirty-two, 32-bit general purpose registers. GPR 109 is implemented as two 6-port arrays (one array for L-pipe register access (LRACC), one for I-pipe register access (IRACC)), each with thirty-two, 32-bit registers containing three write ports and three read ports. On all GPR updating instructions, the appropriate GPR write ports are written in order to keep the contents of the files the same. On GPR reads, however, the GPR read ports are dedicated to instructions that are dispatched to RACC stages of associated pipes.

MMU 104 supports multiple (memory) page sizes as well as a variety of storage protection attributes and options. Multiple page sizes improve the translation look-aside buffer (TLB) efficiency and minimize the number of TLB misses. The PPC440 gives programmers the flexibility to utilize any combination of the following possible page sizes in the TLB simultaneously: 1 KB, 4 KB, 16 KB, 64 KB, 256 KB, 1 MB, 16 MB, 256 MB or 1 GB. Having an extremely large page size allows users to define system memory with a minimal number of TLB entries, thereby simplifying TLB allocation and replacement. Small page sizes allow a more efficient usage of memory when allocating small real memory space of data and/or allocating space to many users.

Memory accesses are performed through the Processor Local Bus (PLB) interfaces to/from the instruction cache (I-Cache) 120 or data cache (D-Cache) 122 which are both included in Cache Unit 105. Having these independent bus interfaces for the cache units provides maximum flexibility for designs to optimize system throughput. Memory accesses (loads/stores) which hit in the cache achieve single-cycle throughput. The PPC440 has separate instruction and data caches with 8 word (32 byte) cache lines. Cache Unit 105 is particularly organized to facilitate low-power operation and fast hit/miss determination.

The PPC440 Core, as a member of the PowerPC 400 Family, is supported by the IBM PowerPC Embedded Tools™ program. Development tools for the PPC440 include C/C++ compilers, debuggers, bus functional models, hardware/software co-simulation environments, and real-time operating systems. Support Logic 110 facilitates access to the PowerPC Embedded Tools™ program.

Figure 2:
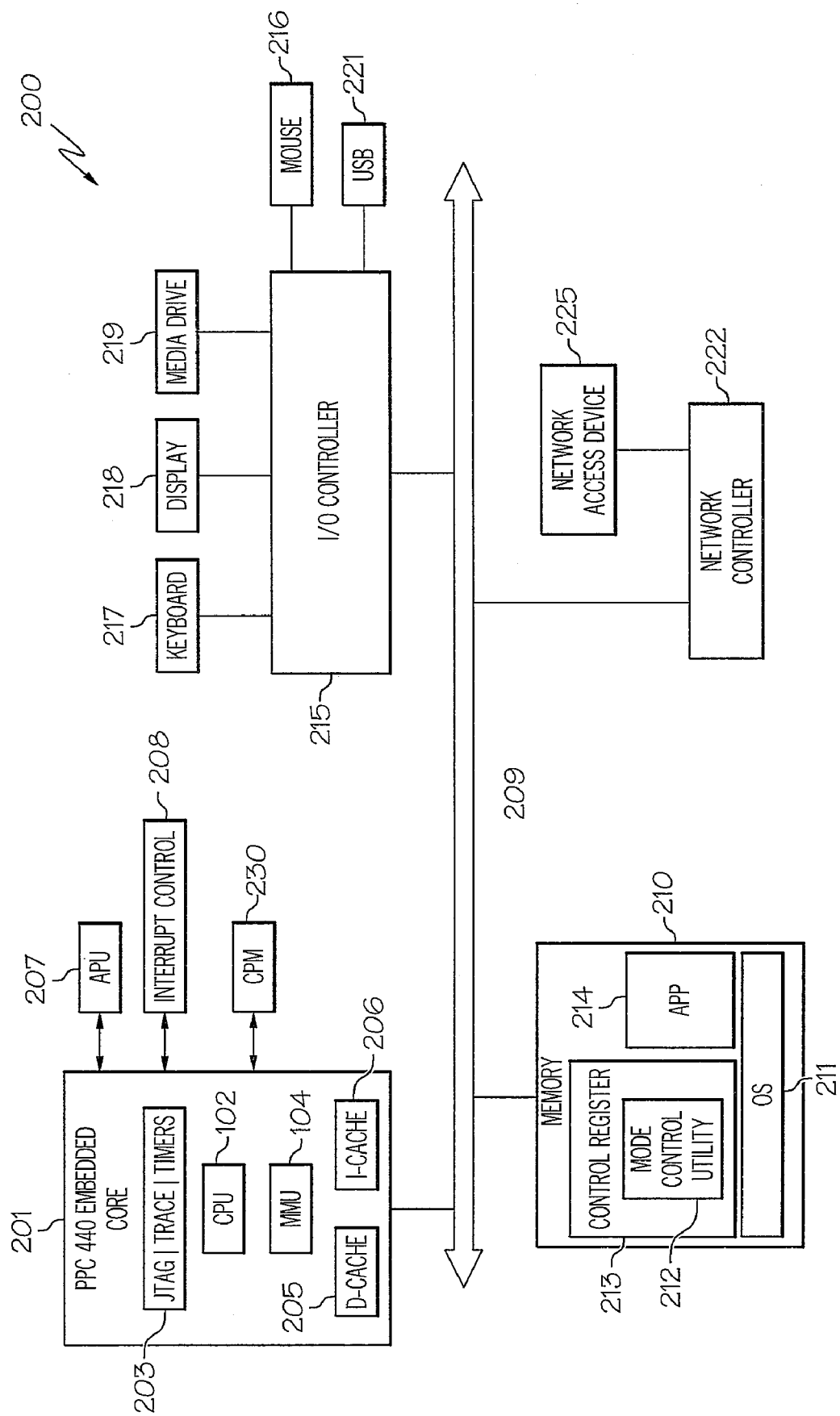
FIG. 2 illustrates a block diagram representation of an example data processing system within which features of the invention may be advantageously implemented.

Referring now to FIG. 2, there is depicted a block diagram representation of a data processing system within which features of the invention may be advantageously implemented. Data processing system (DPS) 200 comprises Core 201 (which may be similar to core 100 of FIG. 1) coupled to memory 210 via system bus/interconnect 209. Included in Core 201 is central processing unit (CPU) 102. As with FIG. 1, core 201 includes registers 203 for JTAG, Trace, and Timers. Core 201 also includes MMU 104, D-cache 205 and I-cache 206. D-cache 205 and I-cache 206 are components of cache unit 105 (FIG. 1). Additionally, descriptions of cache units (205/206) and of MMU 104 are also provided with the illustration of cache unit 105 FIG. 1.

Coupled to and controlling certain specific functions of core 201 are APU 207, Interrupt Controller 208, and clock and power management (CPM) unit 230. According to the described embodiment, CPM unit 230 is responsible for, among other things, controlling the operating/execution frequency of the processor during instruction processing. One embodiment of the software-based implementation of the invention enables a frequency control system to trigger the CPM unit 208 to change the processor's operating frequency from a normal (higher) frequency to a lower frequency based on a detection of certain conditions (or instruction type(s)) within the execution code (i.e., the instruction stream).

Also coupled to system bus 209 is an input/output controller (I/O Controller) 215, which controls access by several input devices, of which mouse 216 and keyboard 217 are illustrated. I/O Controller 215 also controls access to output devices, of which display 218 is illustrated. In order to support use of removable storage media, I/O Controller 215 may further support one or more USB ports 221 and media drive 219, such as compact disk Read/Write (CDRW) or digital video disk (DVD) drive.

DPS 200 further comprises network interface device (NID) 225 by which DPS 200 is able (via Network Controller 222) to connect to and communicate with an external device or network (such as the Internet). NID 225 may be a modem or network adapter and may also be a wireless transceiver device, for example.

Those of ordinary skill in the art will appreciate that the hardware depicted in FIG. 2 may vary. For example, other devices also may be used in addition to or in place of the hardware depicted. Thus, the depicted example is not meant to imply architectural limitations with respect to the present invention. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

A. Processor-Level Execution Frequency Control System

Processor-level frequency control may be implemented in one of the following two embodiments: (1) Software-based control, in which an "on demand" frequency control depends on the CPU clock frequency and the makeup of the application code (number of frequency limiting operations). This first control method provides a normal execution frequency equal to the CPU frequency or a reduced optimal execution frequency that maximizes throughput of the frequency limiting operations; and (2) Hardware-based control, in which a simple logic circuit is implemented within the CPU to detect and compare the number of frequency limiting operations within the program code being scheduled against a threshold number. When the threshold is met, the logic circuit is utilized to switch the mode (of execution frequency) from the normal CPU frequency to the reduced optimal execution frequency.

With either approach, the methodology being employed is to use the existing multiply unit and half-clock the multiply unit for applications requiring clocking frequencies above the 800 Mhz limit. At a CPU frequency of 1000 MHz, the unit throughput is based on the unit operating at half speed, for an example, or equivalent to 500 MHz. For applications in which the number of multiply operations is below the threshold limit, then the processor is allowed to complete full clocking of the multiply operations. Since there are a limited number of multiply operations within the overall program code, the performance "degradation" due to the half-clocking is only recognized during execution of these limited multiply operation, whereas the overall processing operation enjoys substantially higher performance and throughput.

With the software-based implementation, various features of the invention are provided as software/firmware code stored within memory 210 or other storage and executed by CPU 102. Among the software code is code for enabling the "frequency control" features described below (also referred to as "mode" control to coincide with a normal mode of (higher) frequency operation and a second mode of (lower) frequency operation). For simplicity, the collective body of code (including firmware and logic) that enables the frequency control features is referred to herein as the mode control utility.

Thus, as shown by FIG. 2, in addition to the above described hardware components, data processing system 200 further comprises a number of software components, including operating system (OS) 211 (e.g., Microsoft Windows®, a trademark of Microsoft Corp, or GNU®D/Linux®, registered trademarks of the Free Software Foundation and The Linux Mark Institute) and one or more software applications 214. Data processing system 200 also comprises mode control utility 212 and an associated control register 213. Specifically, mode control utility 212 and associated control register 213 reside in memory 210. Control register 213 maintains a count of the number of (consecutive) instructions of a pre-defined type within the execution stream of an application (e.g., application 214) that is being scheduled for execution by processor core 201.

As utilized herein, OS 211 may represent standard operating system code and/or firmware or hypervisor code with which control utility 212 communicates. Control utility 212 monitors scheduling of compiled code and triggers a change in the processor frequency based on the observance of pre-defined characteristics within the compiled code, namely the presence of a threshold number of frequency limiting operations within the compiled code scheduled for execution. Specifically, control utility 212 determines if the number of multiply operations within the compiled code is greater than a pre-defined threshold number. The control utility 212 then triggers the OS 211 to signal CPM 230 to switch the operating frequency of the processor from a high frequency (e.g., 1000 MHz) to a lower optimal frequency (e.g., 800 MHz) at which the processor is able to execute the particular-type operations with maximum throughput. In one embodiment, the control utility 212 generates and forwards the signal to the CPM 200.

In implementation, executable code of OS 211 and mode control utility 212 are executed on CPU 102. According to the illustrative embodiment, when CPU 102 executes mode control utility 212, mode control utility 212 enables CPU 102 to complete a series of functional processes, including: (1) determining when the number of consecutive frequency limiting operations is above the pre-defined threshold limit at which a change in the execution frequency is desired; (2) triggering the OS or the CPM 230 to switch/change an execution frequency from a CPU cycle frequency to a lower optimal execution frequency for the frequency limiting operations, and vice versa; and other features/functionality described below.

In an alternate embodiment, an enhanced software compiler (accessible via support logic 110 of FIGS. 1 and 2) detects that a plurality of applications with multiply class instruction focused operations (larger than a pre-defined threshold) are queued up for execution, and the compiler triggers the CPM to adjust the frequency of the processor to a preset lower frequency that enables the highest multiply operation throughput. The OS utility then readjusts the execution frequency to the regular value (i.e., the normal processor frequency) upon completion of the queued set of multiply focused applications.

To enable a clearer understanding of the invention, the below described embodiments will reference an example processor with maximum operating frequency of 1000 MHz and which executes regular type operations (e.g., add and subtract) at the maximum operating frequency. Additionally, the processor also executes particular-type operations at a different, lower, frequency (e.g., 500 MHz) when execution of these operations occurs without implementation of the features of the invention described herein. For consistency in the description, the particular-type operations or frequency limiting operations are primarily referred to as multiply operations, and the mode control features are activated when a preset number of multiply operations are detected occurring (in sequence) within the compiled code (being) scheduled for execution by the processor. The invention is however applicable to other types of frequency limiting operations and the references to multiply operations are solely to aid in describing the embodiments.

Using the above example, during normal operation (without the features of the described embodiments of the present invention), a multiple operation has an effective cycle time of 500 MHz during the fastest throughput because the multiple operation takes multiple cycles (e.g., 3 cycles) to complete, unlike other operations which complete in a single cycle. Faster applications are applications in which the majority of operations are not frequency limiting operations, and thus the processor is able to execute most instructions at the maximum frequency. With these faster applications, frequency limiting operations (multiple operations) are handled by changing the latency of the multiply operation so that the multiple operations take twice as long (i.e., twice as many cycles) to complete. By doubling the number of cycles per multiply operation, the effective cycle time for the multiply operation becomes 500 MHz. The overall throughput suffers; however the entire processor is now able to run above the 800 MHz frequency limit, which leads to faster throughput for applications executing at high speeds. For these higher speed applications, this represents an acceptable tradeoff.

However, with slower applications (e.g., application running below 800 MHz), the multiply operations are preferably run at single cycles (rather then the two cycles per operation when the application is running above 800 MHz). For example, with such slower applications, utilizing only 0.5 of the 800 MHz, the processor achieves a maximum frequency throughput of only 400 MHz. The core is provided a frequency detector, which determines when the core is running above the threshold limits. When the core is running above the threshold limits, the controller introduces a multi-cycle multiplier to increase the number of cycles per operation. This effectively removes the frequency limiting term by allowing the operation to run (or be executed) at half processor speed, doubling the latency, or allowing the operation to run at the optimized processor frequency for multiply operations.

If the executing application does not want to run at the increased cycle speed, the mode control utility forces the application to revert back to the single cycle per access. The introduction of the mode control system provides the ability to dynamically control which code segments are executed at which frequency and when to run an application at the normal speed versus at the slower cycle speed. The effective throughout remains high, within the normal range, and applications that execute slower (e.g., applications with lots of multiply operations) are not penalized by forcing those applications to execute on a single cycle frequency.

Mode control utility 212 implements/controls the various logic components to monitor for and detect the multiply operations within a compiled software code being scheduled for execution. When there are lots of multiply operations queued up for execution, which indicates that the application is best executed as a low frequency application, the mode control utility automatically triggers the CPM 230 to reduce the processor frequency to 800 MHz to accommodate processing of the multiply operations via single cycle processing. Once these multiply operations have completed processing, the mode control utility then triggers the CPM to return the processor frequency to its normal high frequency operation (1000 MHz). While/if the number of multiply operations detected/encountered during high frequency operation is less than the threshold, the mode control utility is programmed to do nothing, and the multiple operations are forced to be completed in two processor cycles, and the processor's effective operating frequency is reduced to 500 MHz frequency for these multiply operations, while processing all other (types of) operations at the 1000 Mhz.

Figure 7:
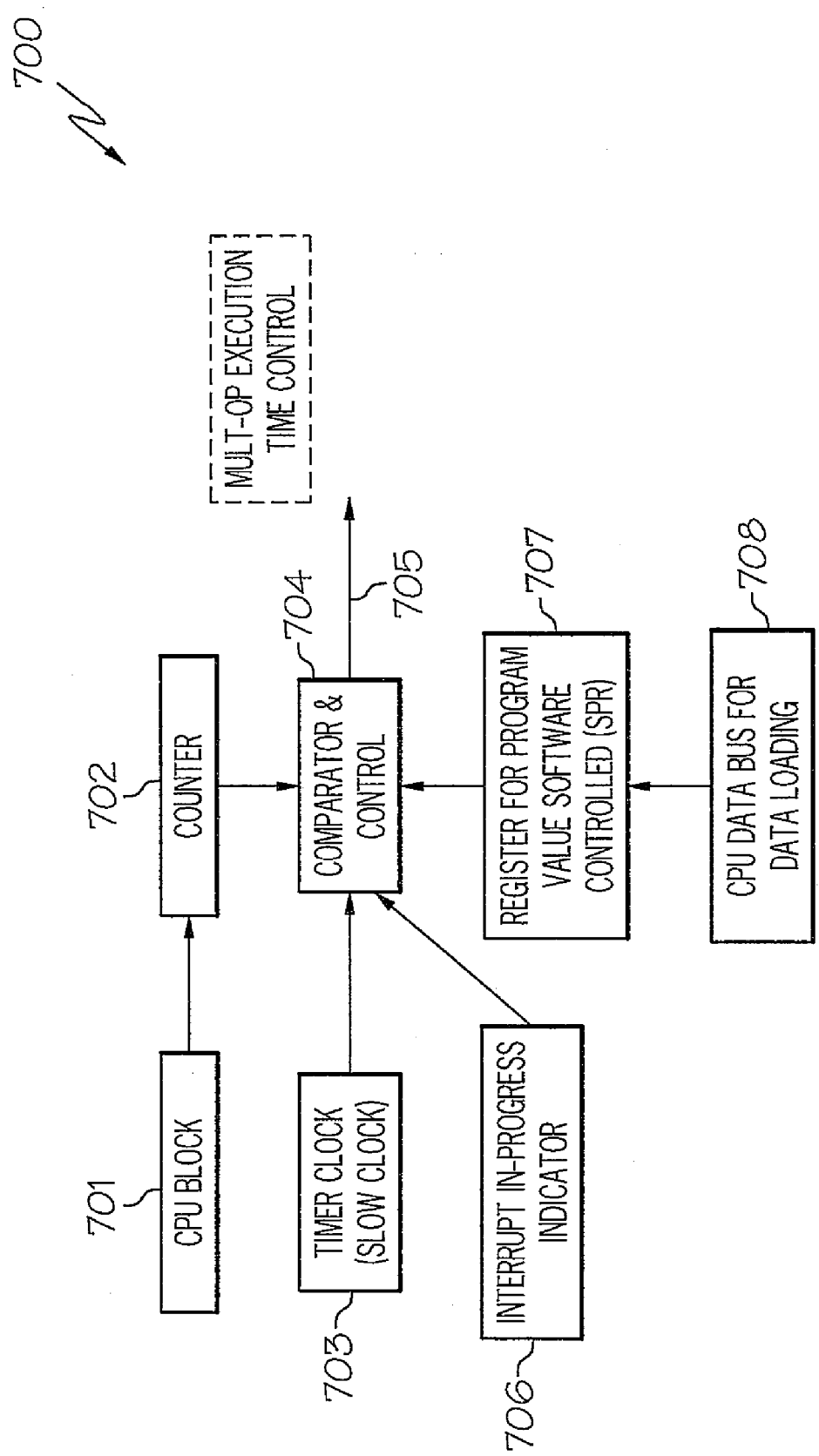
FIG. 7 illustrates a block diagram of CPU frequency detection and control logic for the software-based frequency control system, according to an illustrative embodiment of the present invention.
Figure 8:
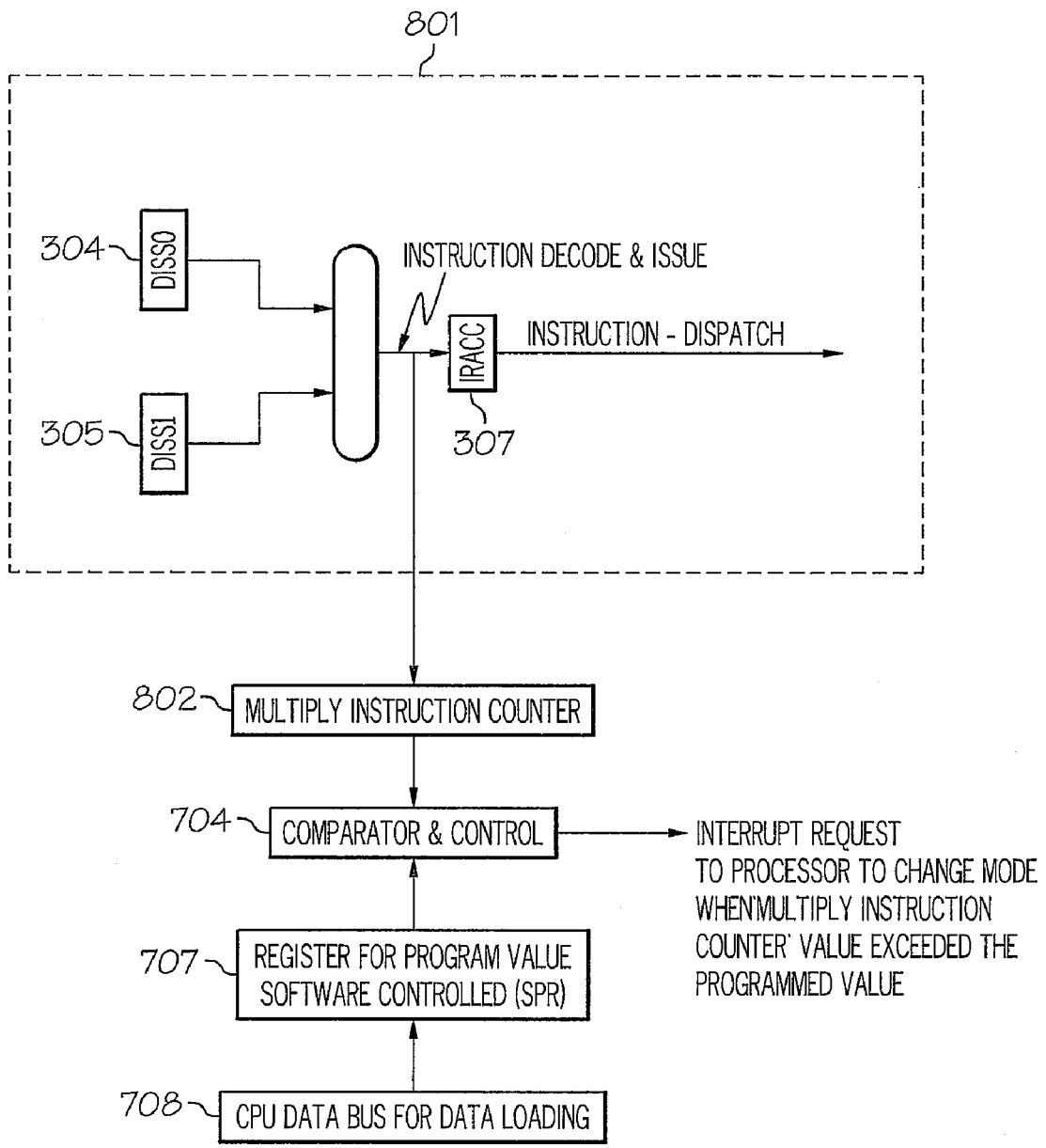
FIG. 8 provides another illustration of the software-based frequency control system, which is coupled to instruction decode and issue logic to count the number of multiply operations scheduled for execution, in accordance with an illustrative embodiment of the present invention.
Figure 9:
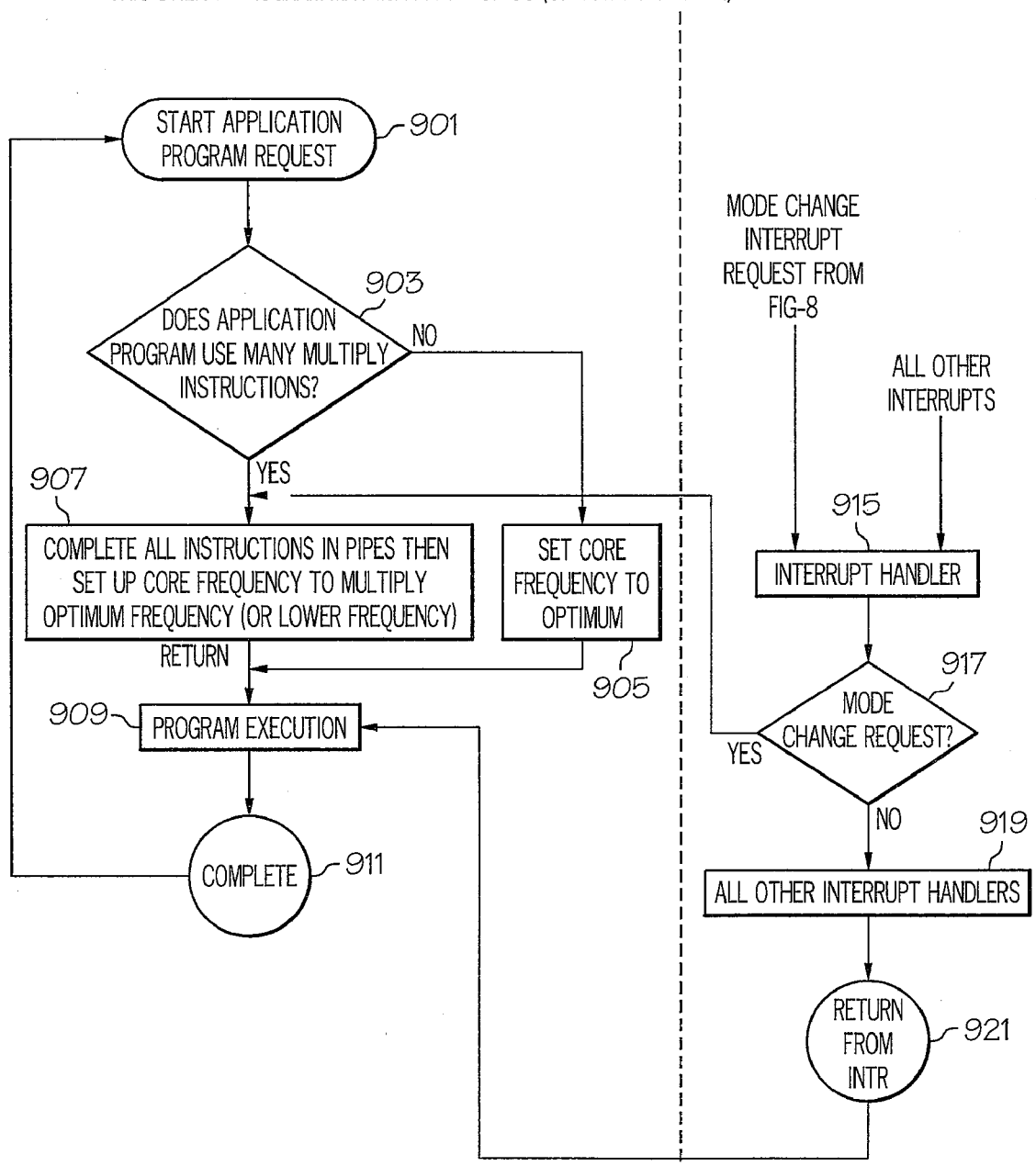
FIG. 9 is a logic flow diagram illustrating the use of the frequency limiting instruction count, detected by the software-based frequency control system according to FIG. 8, to determine when to change the processor's execution frequency, according to one embodiment of the invention.

While described as a separate software-based implementation, in actual implementation, several features of mode control utility are/may be implemented using logic components. FIGS. 7-9 illustrates example logic that may implement or assist in implementing the features of the software-based frequency control system as well as provide a hardware-based implementation.

FIG. 7 illustrates a block diagram which represents CPU frequency control logic for the (multiply) operation control, according to one embodiment of the present invention. Frequency control logic 700 is a counter-based detection logic, which may be implemented to dynamically (on-the-fly) determine an optimal operating frequency. Frequency logic circuit 700 comprises CPU clock 701 which is connected to Counter 702. Frequency Detection Logic 700 also includes Timer clock 703, Interrupt (in-progress) indicator 706, and Register 707, which all connect to Comparator-Control 704. Counter 702 is also connected to Comparator-Control 704. Included in Frequency Detection Logic 700 is CPU data bus 708 for loading data. The output of Comparator-Control 704 is a control signal illustrated as Mult-Op (multiply operation instruction) execution time control 705.

Counter 702 comprises a set of circuits integrated within the processor that essentially counts the number of multiply operations queued within the execution pipe of the processor and provides that number to comparator-control 704, which compares the number of multiply operations against the pre-defined/pre-set threshold number retrieved from the mode control utility (or mode control register 212 of FIG. 2) in the memory. By utilizing Comparator-Control 704, mode control logic 700 determines if the frequency of the processor is above the threshold frequency, which triggers a throttling of the processor operating frequency. If the frequency is above the threshold frequency for throttling the processor operating frequency, the mode control logic decreases the frequency to an optimum frequency for the multiply operations (e.g., 800 MHz). If the number of multiply operations is below the threshold number, then the mode control logic 700 either maintains the frequency at the highest limit (if the frequency is already there), or sets the frequency to the highest frequency. The multiply operations are handled via multiple cycles until the number surpasses the threshold. The value of the threshold is a design parameter, which is selected to enable the largest throughput of operations during execution of program code that may contain multiply operations (or other frequency limiting operations). Users determine the design parameter based on a SoC implementation.

Frequency control logic 700 also includes a facility that sets the multiply operation cycle count. This facility may be addressed as either a configuration register (in register 707) that an operator sets in a static manner or may be a register that is dynamically set. The configuration register is utilized to determine the processor frequency to be exploited.

Mult-Op execution control 705 may be switched or programmed by the privileged code (hypervisor or OS) only and will be used to request a mode control to the Mode control utility as an interrupt (indicated by Interrupt—in-progress—indicator 706) or a context synchronizing operation so that multiply operations are controlled in an orderly manner.

Turning now to FIG. 8, there is illustrated another embodiment of the frequency control logic of FIG. 7, with an internal view of CPU block 701 showing instruction decode components. Within the descriptions of FIGS. 7 and 8, same or similar components are indicated with similar reference numerals. Thus, as illustrated by frequency control logic 800, multiply instruction counter 802 of control logic 800 monitors the output of instruction decode/issue circuitry 801 of the CPU. Instruction decode/issue circuitry 801 includes DISS0 304 and DISS1 305 (two illustrated for example), which decode compiled program code to generate an instruction decode and issue operation. The decoded instruction is passed to IRACC 307, which forwards/dispatches the instruction for execution.

In one embodiment, a "type" characteristic is retrieved from the decoded instruction and forwarded to multiply instruction counter 802 prior to instruction dispatched to the execution pipeline. Notably, in one implementation, the type of instruction is evaluated within the CPU, and a signal is generated and transmitted to the multiply instruction counter 802 (by CPU logic) only when the instruction is a multiply instruction. Each signal received by multiply instruction counter 802 increases the multiply instruction count (register) by one.

In another embodiment, all instruction types are automatically detected and passed to the multiply instruction counter, which includes additional logic to (a) determine if the type signal received is for a multiply instruction and (b) update the counter value by one if the type is a multiply instruction. After each update of the counter, the counter value is passed to comparator and control logic 704, where the number of multiply instructions detected is compared against a pre-set threshold value for triggering a change in processor frequency. When that threshold value is reached (as determined by comparator and control logic 704), comparator and control logic 704 issues an interrupt request to the CPU to cause the CPM to change the CPU's execution/operating frequency to a preset lower frequency, which lower frequency is optimal for executing code containing a large number of multiply operations.

The continuation of the processing from FIG. 8 is illustrated by FIG. 9, which provides a logic flow diagram of the operations of the CPM controlled by frequency control utility/logic and inputs from processor execution units, operating in parallel. Specifically, FIG. 9 describes the process by which logic components are triggered by the frequency control logic to complete/effect the modification of the execution frequency based on determinations made by the frequency control utility/logic. Mode control operations are depicted to the right of the dashed line, while processor execution operations are illustrated to the left of the dashed line. As shown, the mode control process begins at block 901 at which the application program request is initiated (i.e., program code is decoded and instructions are forwarded to the CPU's execution units). At block 903, the mode control utility/logic determines whether the application program includes a number of multiply instructions that is greater than a pre-established frequency switching threshold. If the application does not contain more than the threshold value of multiply instructions, the processor's operating frequency is set to (or maintained at) the normal optimal frequency, as shown at block 905. This normal optimal frequency (which may be the maximum frequency) enables smaller (than the threshold) numbers of multiply operations to be executed in multiple cycles at half the clock frequency.

If, at block 903, the application program does include a larger number of multiply operations than the frequency switching threshold, then the mode control utility/logic triggers the CPM to change the processor frequency to the multiply optimal frequency, which is lower than the normal optimal frequency. All instructions currently within the execution pipeline are first allowed to complete at the normal frequency. Then, the processor frequency is set to the multiply optimal frequency, as shown at block 907. This enables multiply operations to complete in a single cycle at the highest processing frequency for multiply operations, rather than at a lower half frequency. Following, as provided at block 909, execution of the multiply instructions commences at this multiply optimal frequency, and the process ends at termination (complete) block 911.

Completion of the actual switching of the operating frequency mode is triggered by receiving, at the interrupt handler 915 (or interrupt control 208 of FIG. 1), the mode change interrupt request (from FIG. 8). Referring now to the left hand side of FIG. 9, interrupt handler 915 receives all other interrupts to the processor as well as mode control interrupt request. Interrupt handler determines, at block 917, whether an interrupt is received for a mode change request. If a mode change request is received, interrupt handler signals the mode change to the mode control execution logic of the processor. If not, then the interrupt detected falls into the category of other interrupts, which are completed without affecting the operating frequency, as shown at block 919. Following completion of the other interrupts, as provided at block 921, the processor returns to program execution using the frequency mode of operation currently set for the processor.

The above embodiments enable the mode control utility (or mode control logic) to maximize the throughput-frequency relationship when executing a large number of multiple operations (slower application programs). With the above described software-based implementation, the execution pipeline depth is maintained and the amount of power utilized is maintained or reduced over conventional methods. A low frequency application, with a single cycle design continues to operate as a single cycle per instruction application, which ultimately preserves power. Because the change to the frequency is limited to only particular-type operations, which are infrequent within a normal application stream for faster application, implementation of the features provided by the mode control utility provides the best throughput and highest operating frequency (over time) without adding any limitations to the processor and/or without adding components to the execution stages, which would require larger power consumption, as with conventional implementations. Thus, mode control utility 212 controls/reduces (using software controllable logic) the dynamic power usage of the CPU core (on demand or "on the fly"), depending on the optimal operating frequency for an executing application.

B. Pipeline Stage-Level Execution Cycle Control System

With reference now to FIG. 3, which illustrates one embodiment of the pipeline stage-level implementation in which specific hardware logic is provided at specific pipeline stages to enable cycle-per operations control, rather than operating frequency control, to enhance the throughput of the CPU when processing substantial numbers of frequency limiting operations (such as multiply operations). In this embodiment, certain functional features attributed to mode control utility 212 (FIG. 2) and/or mode control logic 700 (FIG. 7) may be utilized to detect when a greater-than-threshold number of multiply operations exist within executing code. Once this condition is detected, however, specific changes are injected into stages of the execution pipeline to adjust the cycle-per-operation processing to enable increased throughput, without changing the CPU's operating frequency.

FIG. 3 is a block diagram illustrating a PPC440 pipeline structure, according to an illustrative embodiment of the present invention. Pipeline 300 comprises Instruction Fetch (IFTH) 301 which is connected to first Pre-Decode (PDCD0) 302 and to second Pre-Decode (PDCD1) 303. PDCD0 302 is connected to first Decode/Issue (DISS0) 304 and second Decode/Issue (DISS1) 305. PDCD1 303 is connected to first Decode/Issue (DISS0) 304 and to second Decode/Issue (DISS1) 305. Although there may be four Decode/Issue units within the processor, only two are shown to illustrate the instruction flow of pipeline 300, since these units are not relevant to the description of the functional features of the present embodiment. DISS0 304 is then connected to both load/store pipe ("L-pipe") first Register Access (LRACC) 306 and integer pipe ("I-pipe") second Register Access (IRACC) 307. Similarly, DISS1 305 is connected to both L-pipe (first) Register Access (LRACC) 306 and I-pipe (second) Register Access (IRACC) 307.

Pipeline 300 contains three execution pipes: a load/store pipe ("L-pipe"), a simple integer pipe ("J-pipe"), and a complex integer pipe ("I-pipe"). The L-pipe and J-pipe instructions are dispatched from LRACC 306. I-pipe instructions are dispatched from IRACC 307. Pipeline 300 further illustrates that LRACC 306 is connected to Address Generation (AGEN) 309 of L-pipe 308 and also to J-pipe Execute stage 1 (JEXE1) 311. IRACC 307 is connected to I-pipe Execute stage 1 (IEXE1) 313. AGEN 309 is then connected to Cache Read (CRD) 315, and CRD 315 is further connected to L-pipe Write Back (LWB) 318. JEXE1 311 is connected to J-pipe Execute stage 2 (JEXE2) 316, and JEXE2 316 is further connected to J-pipe Write Back (JWB) 319. IEXE1 313 is connected to I-pipe Execute stage 2 (IEXE2) 317, and IEXE2 317 is further connected to I-pipe Write Back (IWB) 320. I-pipe execute stage 312 receives input(s) from mode control logic 322.

IFTH 301 is the first stage of a seven stage instruction pipeline. At IFTH 301, instructions are fetched from the instruction cache (I-Cache). First Pre-Decode (PDCD0) 302 and second Pre-Decode (PDCD1) 303, which comprise the second stage of the pipeline, are responsible for partial instruction decode. First Decode/Issue (DISS0) 304 and second Decode/Issue (DISS1) 305 are responsible for final decode and issue to the register access (RACC) stage. LRACC 306 and IRACC 307 comprise the fourth stage, in which, instruction (data) is read from a multi-ported General Purpose Register (GPR) file.

In Pipeline 300, the load/store pipe ("L-pipe") comprises, at stage 5, AGEN 309, CRD 315, at stage 6, and LWB 318 at stage 7. AGEN 309 is responsible for the generation of load/store addresses. CRD 315 is responsible for data cache access. LWB 318 is responsible for writing results into the GPR file (not shown) from integer operation or load operation.

The simple integer pipe ("J-pipe") 310 comprises JEXE1 311 at stage 5, JEXE2 316 at stage 6 and JWB 319 at stage 7. JEXE1 311 is the Execute stage 1 unit in which simple arithmetic is completed. JEXE2 316 is the Execute stage 2 unit in which results from one or more Execute stage 1 units in other execution pipelines are multiplexed, in preparation for writing into the GPR file. At IWB 319, J-pipe results are written into the GPR file.

The complex integer pipe ("I-pipe") 312 comprises IEXE1 313 at stage 5, IEXE2 317 at stage 6 and IWB 320 at stage 7. IEXE1 313 is the Execute stage 1 in which complex arithmetic is completed. IEXE2 317 is the Execute stage 2 unit in which results from one or more Execute stage 1 units in other execution pipelines are multiplexed (in) in preparation for writing into the GPR file. At IWB 320, I-pipe results are written into the GPR file.

Pipeline 300 also includes (or receives input from) mode control logic 322, which is utilized to (a) increase the instruction throughput for multiply operations and (b) control/reduce the dynamic power usage of the CPU core when processing multiply operations. In one embodiment, the dynamic power usage of the CPU core is reduced by hardware utilizing CPU frequency detection logic/circuits to control one of the execution pipeline latency/frequency without changing the CPU frequency.

Generally, RISC (or superscalar) processors have many execution units designed within the processors. PPC440 is an example superscalar RISC processor, which has multiple functional (execution) units. In a superscalar RISC CPU, most of the instructions may be executed in other pipes and therefore, this instruction-based control does not affect the overall CPU performance. For instance, the throughputs and latencies of frequently used loads/stores, many simple arithmetic and logical operations are not affected, since the CPU clock frequency is unchanged.

As illustrated by FIG. 3, mode control logic 322 supports the instruction latency and the throughput per instruction base (selected instruction) in order to increase throughput and reduce CPU dynamic power usage, all without greatly impacting the CPU performance (frequency, etc.). Mode control logic 322 controls execution time (or usage) of one or more of the functional units in the PPC440 core without changing the pipeline structure and control, and without changing the CPU clock frequency. Mode control logic 322 enables addition of software-controllable cycles in place of the regular CPU clock frequency for timing the completion of multiply operations. Thus, mode control logic 322 is capable of exploiting the highest frequency and thus the highest work load/throughput of a processor design without being limited to its slowest sub assembly/component.

Mode control logic 322 is designed to control the execution time of selected instructions without adding data staging registers or extensive controls. In conventional designs, data staging registers and/or corresponding controls are required to adjust the instruction execution time/throughput when the CPU instruction issue rates are maintained. With mode control logic 322 of the present invention, however, the CPU instruction issue rates are maintained but the selected instruction stage execution times are controlled by hardware (with embedded or other controlling software). Therefore, the execution times of all other instructions that use the same pipeline are not affected compared to the stage-based controls which affect only particular-type instructions using particular sections of the pipeline.

The operating frequency or CPU frequency is not changed, but the stages are enabled every other cycle, which is equivalent to a "half clocking" frequency. The mode control logic 322 modulates the number of cycles required to complete the multiply operations based on a pre-defined threshold number (e.g., 4) of multiply operations detected within the execution stream. When the number of multiply operations is equal to or larger than the threshold number, the number of cycles per multiply operation is increased by a factor (e.g., factor of two, which doubles the number of cycles per instruction). With this change/modification, the effective throughout on the 1 GHz processor remains 1 GHz for all other operations in the execution pipe, while effectively becoming 500 MHz for the multiply operations.

Turning now to FIG. 4A, there is depicted a block diagram representation of a first-stage mode control logic 440 for an Execute stage 1 unit (Iexe1) for multiply operations (and multiply and accumulate (MAC) operations), according to an illustrative embodiment of the present invention. In Iexe1 400, Iexe1Mult 401 and Iexe1Mac 402 are inputs to OR gate 403. The output of OR gate 403 is a first input to AND gate 404. The output of AND gate 404 is then received by delay-extend logic 405, of which, Iexe1MultHold 406 is the output. Iexe1MultHold 406 is the input applied to a free running latch, latch 407, the output of which is Iexe1MultMacDesL2 408. Iexe1MultMacDesL2 408 is a first input to MUX 412. Additionally, Iexe1MultUnitEnL2 411 is the second input to MUX 412, while CCR1_Fine 409 is the select input to MUX 412. Iexe1MultMacDesL2 408 is inverted by inverter, Inv 410, and the inverted output is provided as a second input to AND gate 404. Finally, Iexe1MultMacUnitEn 413 is the output of MUX 412.

Iexe1MultMacUnitEn 413, with an adjusted/selected timing characteristic, replaces Iexe1MultUnitEnL2 401 in the Execute stage 1 of the pipeline. Iexe1MultMacUnitEn 413 is also utilized to derive Iexe2MultOrMacE1 in the Execute stage 2 of the pipeline. When CCR1_Fine is de-asserted, a delay control signal 408 is selected. However, when CCR1_Fine is asserted, non-delay control, which is Iexe1MultUnitEnL2, is selected to control Iexe1MultMacUnitEn. This signal is used to derive Iexe2 stage of multiply stage.

Iexe1 400 is an execution unit which is designed for complex instruction executions. Iexe1 400 is structured to handle a number of functions including the following: logical function; addition; subtraction; multiplication; and division. In addition, delay-extend logic 405 allows the pipeline to be extended as latency is added to the execution stage. Delay-extend logic 405 may represent one or more components of a hardware implementation of the mode control utility. CCR1_Fine 409 represents a select bit or set of bits from the Core Configuration Register (CCR) which determines the output of MUX 412 based on the input selected by CCR1_Fine 409. The extension of the pipeline and the introduction of latency are also apparent from the timing diagrams of FIG. 5A, FIG. 5B, FIG. 6A, and FIG. 6B.

FIG. 4B illustrates a second-stage mode control logic for an Execute stage 2 unit (Iexe2) for multiply and MAC operations, according to an illustrative embodiment of the present invention. In Iexe2 420, IwbMultorMacE1 421 is a first input to AND gate 422. The output of AND gate 422 is received by first delay-extend logic 423. The output of first delay-extend logic 423 is then applied to a free running latch, latch 424, the output of which is Iexe2MultMacDesL2 425. Iexe2MultMacDesL2 425 is a first input to second MUX 429, which receives IwbMultorMacE1 428 as the second input and CCR1_Fine 426 as the select input. IwbMultOrMacE1Out 430 is the output of MUX 429. Iexe2MultMacDesL2 425 is inverted by inverter, Inv 427, and the inverted output is provided as the second input to AND gate 422.

In Iexe2 420, Iexe2MultUnitEnL2 431 and Iexe2MacUnitEnL2 432 are inputs to OR gate 433. The output of OR gate 433 is a first input to AND gate 434. The (inverted) output of Inv 427 is the second input to AND gate 434. Finally, the output of AND gate 434 is received by second delay-extend logic 435 which yields Iexe2MultHold 436 as the output.

In Iexe2 420, IwbMultOrMacE1 421 is a signal for which a multiply or MAC result is first available in the IWB stage. However, the multiply or MAC operation is in Execute stage 2. As provided within this illustration, "Iwb" merely indicates that the operation/signal is for IWB stage enable control, which is the control handshake between Iexe2 and Iwb stages. First delay-extend logic 423 allows pipeline (420) to be extended. Second delay-extend logic 435 provides additional pipeline extension capability. First delay-extend logic 423 and second delay-extend logic 435 may represent components of a hardware implementation of the mode control mechanism.

Figure 5A:
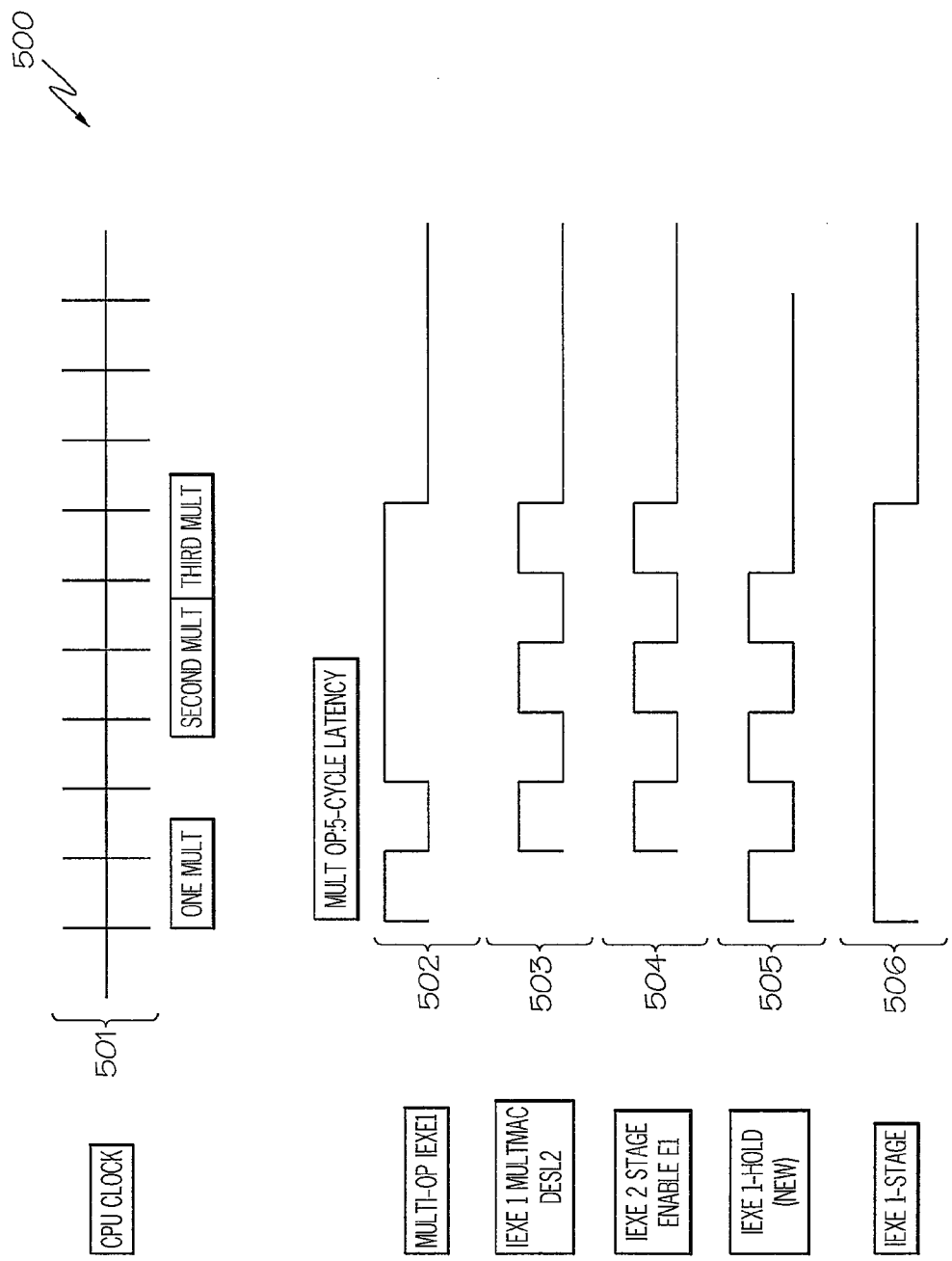
FIG. 5A illustrates an example timing diagram for consecutive multiply operations in Execute stage 1 and Execute stage 2 of the multiplier pipeline, according to an illustrative embodiment of the present invention.

FIG. 5A illustrates an example timing diagram for consecutive multiply operations with one cycle latency delay added per multiple instruction, as an example, in Execute stage 1 (313) of the multiplier pipeline (312), according to an illustrative embodiment of the present invention. Timing diagram 500 comprises CPU clock waveform 501 and Mult-op iexe1 waveform 502. Mult-op iexe1 waveform 502 shows that three multiply operations are in the execution pipeline. A first multiply operation is followed by another (non-multiply) pipe operation. A second multiply operation follows the non-multiply pipe operation. Finally, a third multiply operation immediately follows the second multiply operation. Iexe1MultMacDesL2 waveform 503 is a resulting timing waveform for output Iexe1MultMacDesL2 408 following an assertion of an I-Pipe register hold and an assertion of new Execute stage 1 hold 505. As a result of adding the single delay cycle per multiply instruction, six execution cycles are provided with each multiply instruction having two cycles for execution. Iexe2 stage enable E1 504 allows Execute stage 2 processing to take place immediately following Execute stage 1. Iexe1-stage 506 is a resulting extended timing waveform for the Execute stage 1 of the multiplier pipeline.

Figure 5B:
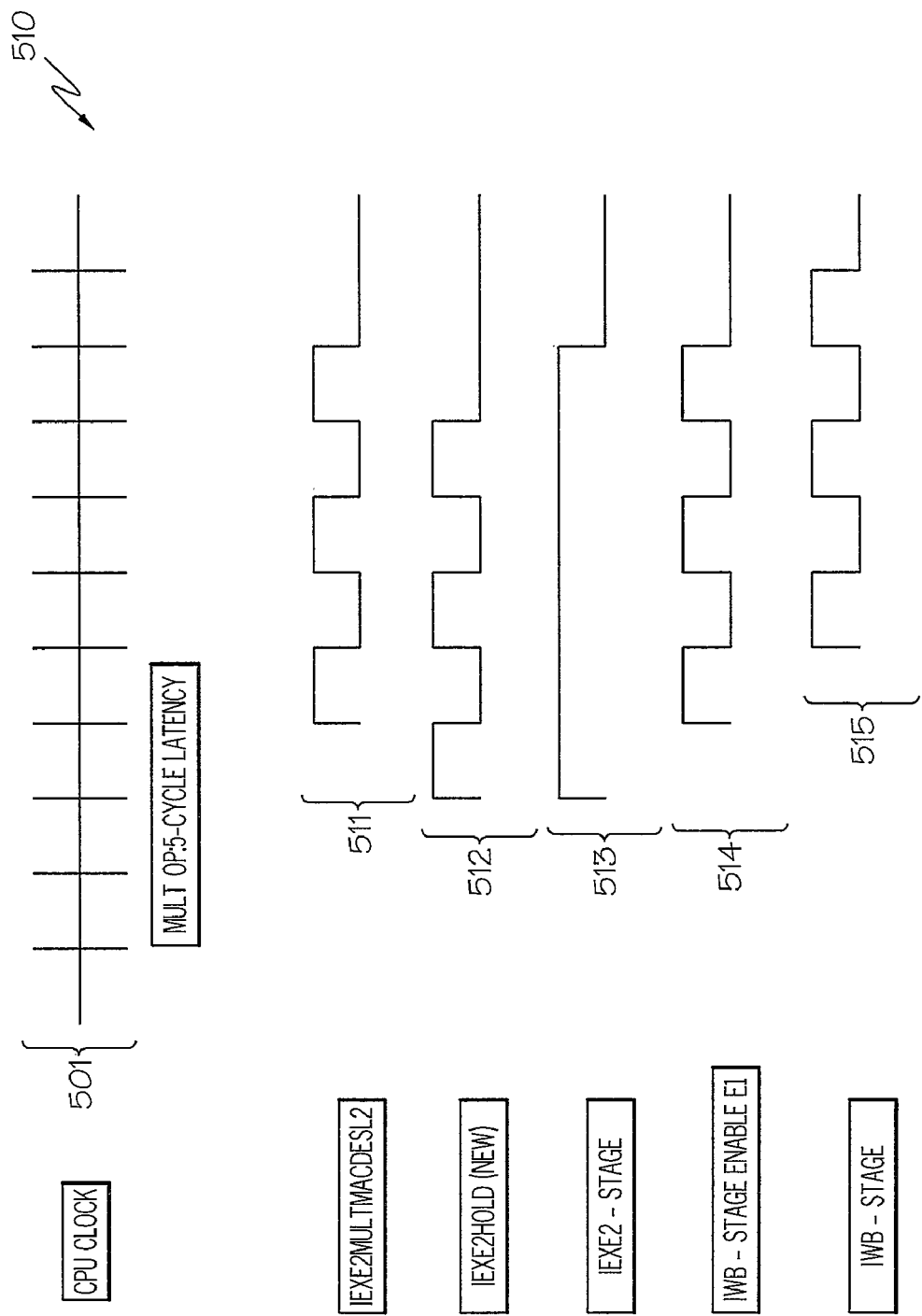
FIG. 5B illustrates an example timing diagram for consecutive multiply operations in Execute stage 2 and Write-back stage of the multiplier pipeline, according to an illustrative embodiment of the present invention.

FIG. 5B illustrates an example timing diagram for consecutive multiply operations with one cycle latency delay added per multiply stage, as an example, in Execute stage 2 of the multiplier pipeline, according to an illustrative embodiment of the present invention. FIG. 5B represents the continuation of FIG. 5A. Iexe2MultMacDesL2 waveform 507 is a timing waveform for output Iexe2MultMacDesL2 408 following an assertion of an I-Pipe execution stage 1 hold and an assertion of new Execute stage 2 hold 512. The resulting timing waveform for Execute stage 2 is illustrated by Iexe2-stage 513. As shown, each multiply operation is now allocated two cycles for completion. The Iwb stage enable E1 waveform 510 demonstrates that results from previous operations are ready to be written to the GPR file after processing in Execute stage 2. Iwb-stage 515 is the timing waveform for the actual writing of results to the GPR file.

Figure 6A:
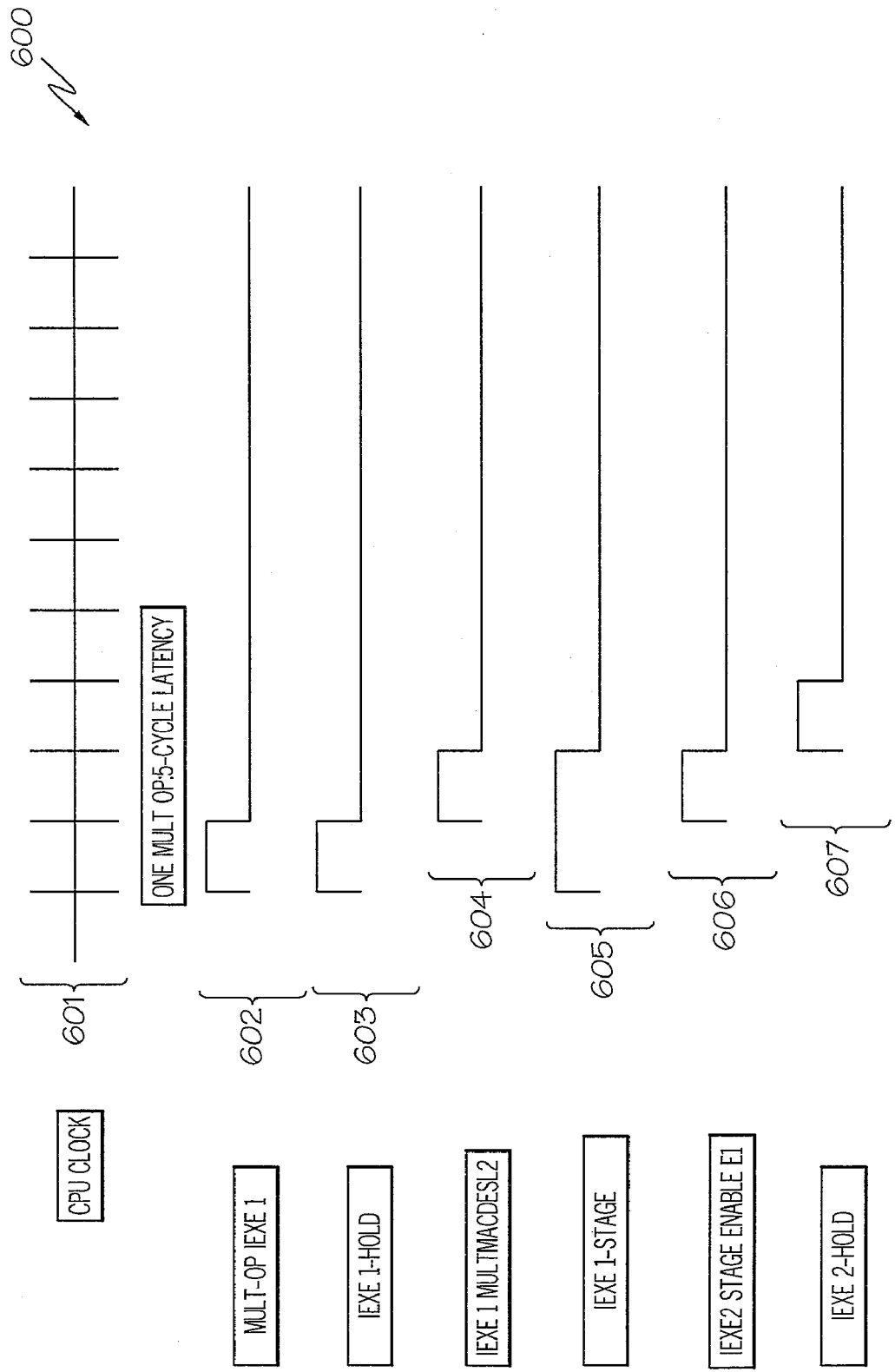
FIG. 6A illustrates an example timing diagram for a multiply operation in Execute stage 1 and Execute stage 2 of the multiplier pipeline having holds due to hazard conditions, according to an illustrative embodiment of the present invention.

FIG. 6A illustrates an example timing diagram for a single multiply operation in Execute stage 1 and Execute stage 2 of the multiplier pipeline, according to an illustrative embodiment of the present invention. Timing diagram 600 comprises CPU waveform 601 and Mult-op iexe1 waveform 602. Mult-op iexe1 waveform 602 shows a multiply operation in the execution pipeline. Iexe1MultMacDesL2 waveform 604 is a timing waveform for output (of latch 407 in FIG. 4) Iexe1MultMacDesL2 408, for example, following an assertion of an I-Pipe register hold. The I-Pipe register hold timing waveform is illustrated by Iexe1-hold 603. Iexe1-stage 605 is a resulting extended timing waveform for the Execute stage 1 of the multiplier pipeline. Iexe2 stage enable E1 606 allows Execute stage 2 processing to take place immediately following Execute stage 1.

Figure 6B:
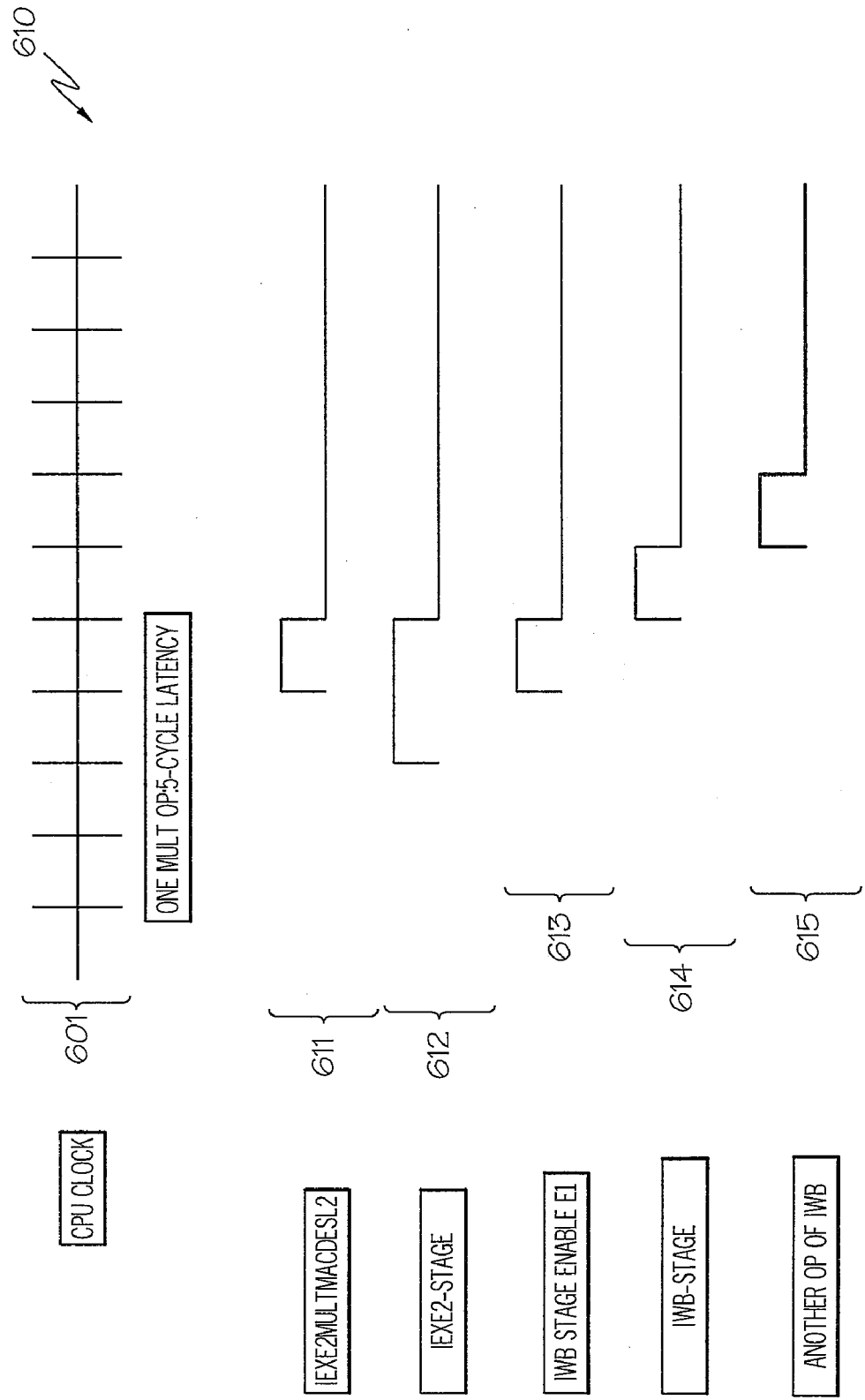
FIG. 6B illustrates an example timing diagram for a multiply operation in Execute stage 2 and Write-back stage of the multiplier pipeline having hazard conditions, according to an illustrative embodiment of the present invention.

FIG. 6B illustrates an example timing diagram for a single multiply operation in Execute stage 2 and Write-back stage of the multiplier pipeline, according to an illustrative embodiment of the present invention. An Execute stage 2 hold, Iexe2-hold 607, allows Execute stage 2 to become a two-cycle execution stage. The timing resulting waveform for Execute stage 2 is illustrated by Iexe2-stage 612. Iexe2MultMacDesL2 611 is a timing waveform for output (of latch 424 in FIG. 4B) Iexe2MultMacDesL2 425, for example, following an assertion of an I-Pipe execute hold. Iwb stage enable E1 waveform 613 prepares results from previous operations to be written to the GPR file after processing in Execute stage 2. Iwb-stage 614 is the timing waveform for the actual writing of results to the GPR file. The timing waveform for another write back (WB) operation on I-pipe is illustrated by AnotherOP-iwb 615, which is an example of another subsequent non-multiply instruction completing.

In the timing waveforms of FIG. 5A, FIG. 5B, FIG. 6A, and FIG. 6B, a multiply function may be executed every other clock cycle. IEXE1, IEXE2 & IWB are two-cycles having being extended by assertion of "hold" when mode control utility 212 is de-asserted by software or, alternatively, by hardware. The fact that the multiply instruction mix is rather small in many of the known benchmark tests minimizes any performance drawback resulting from the (extended) two-cycle execution time. In addition, the two-cycle execution stage time (per multiply operation) triggered by mode control utility 212 reduces dynamic power consumption of the CPU core and the area of the CPU core.

While the present invention is described from the perspective of the particular-type operations being primarily multiply operations, it is recognized that the descriptions and enhancements provided are applicable to various other arithmetic and logical operations for which execution time may be controlled by software or alternatively by hardware, in a manner consistent with the present invention.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In an instruction processor which processes program instructions, a method comprising:
   determining when a pre-determined number of first-type instructions are scheduled to be executed, wherein the pre-determined number of first-type instructions is greater than one (1); and
   when the pre-determined number of first type instructions are scheduled to be executed, automatically switching an execution frequency of the instruction processor from a first frequency that is optimal for processing other-type instructions to a second, pre-established lower frequency, which is optimal for processing the first-type instructions, to enable more efficient execution and higher execution throughput of the pre-determined number of first-type operations, wherein the other-type instructions are less than the pre-determined number of first-type instructions and executed at the first frequency.

2. The method of claim 1, further comprising automatically switching back from the second, lower frequency to the first frequency when the number of first-type operations has completed execution.

3. The method of claim 2, wherein the evaluating is completed via a software compiler, which monitors the sequence of instructions within the program instructions during program compilation and issues an interrupt to effect a change in the processor execution frequency to the second frequency when the number of first-type instructions exceeds a threshold number, indicating execution of a slower program.

4. The method of claim 2, wherein the evaluating is completed via a hardware logic, which monitors the sequence of instructions within the program instructions during instruction scheduling at the processor and issues an interrupt to effect a change in the processor execution frequency to the second frequency when the number of first-type instructions issued for scheduling exceeds a threshold number, indicating execution of a slower program.

5. The method of claim 1, wherein said determining further comprises:
   evaluating when a pre-defined threshold number of the first-type instructions are scheduled for execution within executing program code; and
   when the number of first-type instructions scheduled for execution is at least as great as the threshold number of first-type instructions, triggering the processor to switch the execution frequency to the second, lower execution frequency.

6. The method of claim 5, wherein the triggering the processor to switch the execution frequency includes switching the processor execution frequency to the second execution frequency after the processor completes execution of previously scheduled other-type instructions.

7. The method of claim 1, wherein the evaluating comprises:
   counting the number of first-type instructions being issued to an execution scheduler of the processor;
   comparing the number of first-type instructions to the pre-set threshold number;
   automatically issuing an interrupt signal to effect a change of frequency at the processor to the second frequency to enable a higher instruction throughput for the first-type instructions.

8. The method of claim 7, wherein said automatically issuing comprises forwarding the interrupt signal to a clock and power management (CPM) unit associated with the processor, wherein the CPM unit sets and updates the processor execution frequency based when the interrupt signal is received.

9. The method of claim 1 further comprising:
   storing a threshold value as a lower limit on a number of consecutive first-type operations in a given interval to trigger the automatic switching of the processor frequency; and
   wherein said determining comprises comparing the number of first-type operations against the threshold value, such that the automatic switching is activated when the number of first-type operations within the interval is at least the threshold value.

10. The method of claim 1, wherein:
   the other-type instructions are instructions which execute at the first optimal frequency that provides maximum processor instruction throughput; and
   the first-type instructions are arithmetic and logical operations, including multiply operations, which cause the processor to execute at an effective frequency that is less than the second frequency when the processor is set to operate at the first optimal frequency, such that processor instruction throughput is substantially reduced.

11. A data processing system comprising:
   a processor for processing program instructions;
   an instruction fetch mechanism within the processor for fetching a sequence of instructions for execution within the processor; and
   processing logic associated with the processor for:
      determining when a pre-determined minimum number of first-type instructions are scheduled to be executed, wherein the pre-determined number is greater than one (1);
      when the pre-determined minimum number of first-type instructions are scheduled to be executed, automatically switching an execution frequency of the instruction processor from a first frequency that is optimal for processing other-type instructions to a second, pre-established lower frequency, which is optimal for processing the first-type instructions, to enable more efficient execution and higher execution throughput of the number of first-type operations, wherein the other-type instructions are less than the pre-determined number of first-type instructions and executed at the first frequency;
   automatically switching back from the second, lower frequency to the first frequency when the number of first-type operations has completed execution.

12. The data processing system of claim 11, wherein said logic for determining further comprises logic for:
   evaluating when a pre-defined threshold number of the first-type instructions are scheduled for execution within executing program code; and
   when the number of first-type instructions scheduled for execution is at least as great as the threshold number of first-type instructions, triggering the processor to switch the execution frequency to the second, lower execution frequency;
   wherein the triggering the processor to switch the execution frequency includes switching the processor execution frequency to the second execution frequency after the processor completes execution of previously scheduled other-type instructions.

13. The data processing system of claim 11, wherein the logic for evaluating comprises logic for:
   counting the number of first-type instructions being issued to an execution scheduler of the processor;
   comparing the number of first-type instructions to the pre-set threshold number; and
   automatically issuing an interrupt signal to effect a change of frequency at the processor to the second frequency to enable a higher instruction throughput for the first-type instructions;
   wherein said automatically issuing comprises forwarding the interrupt signal to a clock and power management (CPM) unit associated with the processor, wherein the CPM unit sets and updates the processor execution frequency based when the interrupt signal is received.

14. The data processing system of claim 12, wherein the logic for evaluating is completed via one of:
   a software compiler, which monitors the sequence of instructions within the program instructions during program compilation and issues an interrupt to effect a change in the processor execution frequency to the second frequency when the number of first-type instructions exceeds a threshold number, indicating execution of a slower program; and
   a hardware logic, which monitors the sequence of instructions within the program instructions during instruction scheduling at the processor and issues an interrupt to effect a change in the processor execution frequency to the second frequency when the number of first-type instructions issued for scheduling exceeds a threshold number, indicating execution of a slower program.

15. The data processing system of claim 11, further comprising logic for:

storing a threshold value as a lower limit on a number of consecutive first-type operations in a given interval to trigger the automatic switching of the processor frequency; and wherein said determining comprises comparing the number of first-type operations against the threshold value, such that the automatic switching is activated when the number of first-type operations within the interval is at least the threshold value.

16. The data processing system of claim 11, wherein:

the other-type instructions are instructions which execute at the first optimal frequency that provides maximum processor instruction throughput; and the first-type instructions are arithmetic and logical operations, including multiply operations, which cause the processor to execute at an effective frequency that is less than the second frequency when the processor is set to operate at the first optimal frequency, such that processor instruction throughput is substantially reduced.

17. A processor comprising:

an execution pipeline for executing various types of program instructions including (a) regular-type instructions which execute at a first optimal frequency that provides maximum processor instruction throughput; and (b) a first-type instructions, such as arithmetic and logical operations, including multiply operations, which cause the processor to execute at an effective frequency that is less than a second frequency that is optimal for executing the first-type instructions, when the processor is set to operate at the first optimal frequency, such that processor instruction throughput is substantially reduced; and processing logic associated with the processor for:

determining when a pre-determined minimum number of first-type instructions are scheduled to be executed, wherein the pre-determined number is greater than one (1);

when the pre-determined minimum number of first-type instructions are scheduled to be executed, automatically switching an execution frequency of the instruction processor from a first frequency that is optimal for processing other-type instructions to a second, pre-established lower frequency, which is optimal for processing the first-type instructions, to enable more efficient execution and higher execution throughput of the number of first-type operations, wherein the other-type instructions are less than the pre-determined number of first-type instructions and executed at the first frequency; and automatically switching back from the second, lower frequency to the first frequency when the number of first-type operations has completed execution.

18. The processor of claim 17, wherein said logic for determining further comprises logic for:

evaluating when a pre-defined threshold number of the first-type instructions are scheduled for execution within executing program code; and when the number of first-type instructions scheduled for execution is at least as great as the threshold number of first-type instructions, triggering the processor to switch the execution frequency to the second, lower execution frequency;

wherein the triggering the processor to switch the execution frequency includes switching the processor execution frequency to the second execution frequency after the processor completes execution of previously scheduled other-type instructions.

19. The processor system of claim 17, wherein the logic for evaluating comprises logic for:

storing a threshold value as a lower limit on a number of consecutive first-type operations in a given interval to trigger the automatic switching of the processor frequency; and counting the number of first-type instructions being issued to an execution scheduler of the processor;

comparing the number of first-type instructions to the preset threshold number, wherein the automatic switching is activated when the number of first-type operations within the interval is at least the threshold value; and automatically issuing an interrupt signal to effect a change of frequency at the processor to the second frequency to enable a higher instruction throughput for the first-type instructions;

wherein said automatically issuing comprises forwarding the interrupt signal to a clock and power management (CPM) unit associated with the processor, wherein the CPM unit sets and updates the processor execution frequency based when the interrupt signal is received.

20. The data processing system of claim 18, wherein the logic for evaluating is completed via one of:

a software compiler, which monitors the sequence of instructions within the program instructions during program compilation and issues an interrupt to effect a change in the processor execution frequency to the second frequency when the number of first-type instructions exceeds a threshold number, indicating execution of a slower program; and a hardware logic, which monitors the sequence of instructions within the program instructions during instruction scheduling at the processor and issues an interrupt to effect a change in the processor execution frequency to the second frequency when the number of first-type instructions issued for scheduling exceeds a threshold number, indicating execution of a slower program.

* * * * *